US008282827B2

(12) United States Patent
Van Slyke

(10) Patent No.: US 8,282,827 B2
(45) Date of Patent: Oct. 9, 2012

(54) SYSTEM AND METHOD FOR PRODUCING METHANE, AN ORGANIC BASED FERTILIZER AND USABLE WATER FROM ANIMAL WASTE

(75) Inventor: J. Victor Van Slyke, Vancouver (CA)

(73) Assignee: ATD Waste Systems Inc., Vancouver (CA)

( * ) Notice: Subject to any disclaimer, the term of this patent is extended or adjusted under 35 U.S.C. 154(b) by 359 days.

(21) Appl. No.: 12/580,239

(22) Filed: Oct. 15, 2009

(65) Prior Publication Data
US 2010/0219124 A1 Sep. 2, 2010

Related U.S. Application Data

(60) Provisional application No. 61/156,375, filed on Feb. 27, 2009.

(51) Int. Cl.
C02F 3/28 (2006.01)
C05F 3/00 (2006.01)
(52) U.S. Cl. .............. 210/603; 210/631; 71/10; 71/21
(58) Field of Classification Search .............. 210/603, 210/631, 748.1, 748.11; 71/10, 21
See application file for complete search history.

(56) References Cited

U.S. PATENT DOCUMENTS

| | | | |
|---|---|---|---|
| 3,878,303 A * | 4/1975 | Hashimoto | ..................... 426/56 |
| 4,093,544 A | 6/1978 | Ross | |
| 5,393,317 A | 2/1995 | Robinson | |
| 5,914,040 A | 6/1999 | Pescher et al. | |
| 6,083,386 A | 7/2000 | Lloyd | |
| 6,206,945 B1 | 3/2001 | Weiss, Jr. et al. | |
| 6,224,646 B1 * | 5/2001 | Arato et al. | ......................... 71/9 |
| 6,245,121 B1 | 6/2001 | Lamy et al. | |
| 6,387,272 B2 | 5/2002 | Hirth et al. | |
| 6,569,332 B2 * | 5/2003 | Ainsworth et al. | ........... 210/603 |

(Continued)

FOREIGN PATENT DOCUMENTS
CA 2343832 10/2002
(Continued)

OTHER PUBLICATIONS

Simpkins, Dulcey. "Anaerobic digester FAQs", Sep. 2005, pp. 1-3, Michigan Biomass Energy Program, Michigan Department of Labor & Economic Growth Energy Office.

(Continued)

*Primary Examiner* — Fred Prince
(74) *Attorney, Agent, or Firm* — Cameron IP

(57) ABSTRACT

A method of producing methane, an organic based fertilizer and usable water from animal waste includes the step of separating the animal waste into liquid waste and solid waste. The solid waste is subjected to anaerobic digestion to produce methane and a wet by-product. The wet by-product is pressed to into a filter cake which is pelletized into the organic based fertilizer. The liquid waste is clarified to produce a supernatant and a sludge which is pressed into a filter cake together with the wet by-product. Ammonia is extracted from the supernatant to produce ammonium sulfate and an aqueous solution. The aqueous solution is filtered to produce a concentrate and water filtrate. The water filtrate may be used as drinking or washing water. The ammonium sulfate and concentrate may be used to supplement to the solid waste which is pelletized into the organic based fertilizer. In alternative embodiments a portion of the supernatant and aqueous solution may be used as a liquid fertilizer.

10 Claims, 4 Drawing Sheets

U.S. PATENT DOCUMENTS

| | | | |
|---|---|---|---|
| 6,692,642 B2* | 2/2004 | Josse et al. | 210/605 |
| 6,916,426 B2 | 7/2005 | Van Slyke et al. | |
| 7,014,768 B2* | 3/2006 | Li et al. | 210/603 |
| 7,232,036 B2 | 6/2007 | Van Slyke et al. | |
| 7,972,517 B1 | 7/2011 | Miller | |
| 2002/0020677 A1* | 2/2002 | Noll | 210/766 |
| 2002/0158024 A1* | 10/2002 | Van Slyke et al. | 210/696 |
| 2003/0084693 A1 | 5/2003 | Sower | |
| 2003/0141245 A1* | 7/2003 | Fetterman et al. | 210/609 |
| 2003/0172697 A1 | 9/2003 | Sower | |
| 2004/0025715 A1* | 2/2004 | Bonde et al. | 99/485 |
| 2004/0050777 A1* | 3/2004 | Khan | 210/603 |
| 2004/0226895 A1 | 11/2004 | Bromley | |
| 2006/0021407 A1 | 2/2006 | Poudrette et al. | |
| 2006/0076294 A1 | 4/2006 | Sirkar et al. | |
| 2007/0215562 A1 | 9/2007 | Van Slyke et al. | |
| 2009/0139289 A1* | 6/2009 | Le | 71/10 |
| 2010/0058821 A1 | 3/2010 | Romano et al. | |
| 2011/0283758 A1 | 11/2011 | Carin et al. | |

FOREIGN PATENT DOCUMENTS

| | | |
|---|---|---|
| CA | 2381623 | 10/2002 |

OTHER PUBLICATIONS

"Anaerobic Digestion Systems Web Site", Anaerobic-digestion.com. http://www.anaerobic-digestion.com/.

Kryzanowski, Tony "An oldie but a goodie", Manure Manager Magazine, Sep./Oct. 2009 pp. 1-5, USA.

* cited by examiner

SYSTEM AND METHOD FOR PRODUCING METHANE, AN ORGANIC BASED FERTILIZER AND USABLE WATER FROM ANIMAL WASTE

CROSS-REFERENCE TO RELATED APPLICATION

This application is a continuation-in-part of application Ser. No. 12/538,821 filed in the United States Patent and Trademark Office on Aug. 10, 2009 and which claims the benefit of provisional application No. 61/156,375 filed in the United States and Trademark Office On Feb. 27, 2009, the complete disclosures of which are incorporated herein by reference and priority to which are claimed.

BACKGROUND OF THE INVENTION

1. Field of the Invention

The present invention relates to a method of producing an organic based fertilizer and, in particular, to a method of producing an organic based fertilizer from animal waste in a closed loop system that conserves water.

2. Description of the Related Art

In modern agricultural practice, it has become usual to employ an agricultural operation as an intensive feeding operation for raising hundreds or even thousands of livestock, for example swine and bovine animals, at a single location. Consequently, large amounts of animal waste are produced at such locations. The disposal of this waste in a hygienic and inoffensive manner is problematic.

More particularly, it has been suggested that hogs produce more than four times as much waste as humans. It has, for example, been planned to initiate a hog farm containing 2,000,000 hogs, which will produce an amount of waste equivalent to that produced by the city of Los Angeles. The current pig population of North Carolina is four times that number. Accidents in North Carolina, in which millions of gallons of hog excreta were released into the countryside, have drawn attention to the problems involved in the disposal of such waste. Applications for permits to construct large hog farms have been denied because of concerns about odours and waste disposal.

Animal waste, including hog waste, has traditionally been disposed of by spreading it over agricultural land as a liquid fertilizer. For sufficiently large cropped land bases this method of disposal can be performed safely. However, in areas of high population density or where multiple farms are closely clustered, and the land base is therefore relatively small, problems arise. For example, excess nutrients cannot be absorbed by crops and leach into ground water and surface water.

When land application is prevented, for example, because the ground is frozen or saturated with water and/or nutrients, the waste must be stored, usually in large pits, with consequential costs and environmental risk.

As an alternative to land disposal, it is also common practice to compost the waste. For this purpose, the waste is separated into solid waste and liquid waste through the use of inclined screens, sometimes followed by the use of belt or filter presses. These methods produce an output containing about 30% solid material at best. This is then mixed with a bulking material to facilitate aeration and an appropriate C:N ratio, and deposited in windrows for stabilization, over a period of about 45 to 60 days, by composting. This process may not ensure that pathogens in the waste are killed and the windrows are often odorous and may attract birds, rodents and vermin. The liquid, approximately 90% of the total waste still has to be dealt with through land application.

The challenges involved in the treatment of animal waste include the destruction of pathogens, the controlled extraction of ammonium and other plant nutrients, and the disposal of organic matter.

It is known, from U.S. Pat. No. 4,093,544, issued Jun. 6, 1978, to David S. Ross, the full disclosure of which is incorporated herein by reference, to remove ammonium from wastewater by firstly increasing the pH value of the wastewater, then desorbing ammonium by vacuum and subsequently absorbing the desorbed ammonium in liquid having a pH value and temperature substantially less than that of the original wastewater.

It is further known from U.S. Pat. No. 5,914,040, issued Jun. 22, 1999, to Yvette Pescher et al., the full disclosure of which is also incorporated herein by reference, to purify a medium containing organic waste, for example animal waste, by subjecting the medium to treatment with an oxidizing agent, treatment with a flocculating agent, and treatment with at least one polyelectrolyte. The effluent thus obtained is filtered to provide a filtration cake and a filtrate.

It is still further known from U.S. Pat. No. 6,916,426, issued Jul. 12, 2005, to Van Slyke et al., the full disclosure of which is also incorporated herein by reference, that the extraction of nitrogen, potassium, and phosphorus from animal waste is substantially enhanced if the animal waste is treated promptly after production of the waste by the animals. More particularly, it is known that potassium is present in animal waste material in the form of an insoluble potassium urate, and a substantial amount of the potassium in animal waste material can be extracted in a solid form, as potassium urate, before microbial action breaks down the potassium urate to leave potassium and ammonium in solution. Extracted urates are then available for inclusion in a fertilizer. When the fertilizer is used on land, the microbes in the soil break down these urates, releasing the potassium and ammonia, but at a rate less than that at which these nutrients would be released in the soil if dissolved in water.

It is yet still further known from U.S. Pat. No. 7,232,036, issued Jun. 19, 2007, to Van Slyke et al., the full disclosure of which is also incorporated herein by reference, that solid waste may be rapidly separated from liquid waste using an inclined conveyor belt system.

SUMMARY OF THE INVENTION

It is an object of the present invention to provide an improved system and method for producing an organic based fertilizer.

It is a particular object of the present invention to provide a system and method for producing methane, an organic based fertilizer and usable water from swine and bovine waste collected on an agricultural operation.

In one embodiment of the system and method disclosed herein animal waste is collected at least once daily from a barn or other animal enclosure on an agricultural operation. Preferably solid waste is separated from liquid waste in the barn. The solid waste is directed to a bio-mass fuelled dryer. The dried solid waste may be used as a bio-mass fuel for the system, or supplemented with concentrated by-products of the treatment of the liquid waste and other nutrients, as required, to produce a commercially viable organic based fertilizer. If the solid waste is used as a bio-mass fuel for the system the resulting ash may be added as a supplement to the solid waste prior to pelletizing the solid waste into a fertilizer.

If the solid waste is not burned as a fuel for the system other suitable bio-mass fuel may be used.

The liquid waste is treated with chemicals for coagulation and flocculation to assist the settling of any particulates remaining in the liquid waste. The particulates are then collected and may be added as a supplement to the solid waste prior to pelletizing the solid waste into a fertilizer. After heating and pH adjustments, the liquid waste is passed against a gas transfer membrane to remove ammonia from the liquid waste. Once the ammonia passes through the membrane it is exposed to sulfuric acid to produce ammonium sulfate which may also be added as a supplement to the solid waste prior to pelletizing the solid waste into a fertilizer. The remaining liquid waste is passed through a direct contact distillation membrane to filter water in the liquid waste from the total dissolved solids in the liquid waste. The total dissolved solids may also be added as an additional supplement to the solid waste prior to pelletizing the solid waste into a fertilizer.

The water filtrate is treated with pH adjustments, cooling, and UV sterilization to produce water which is usable for both barn washing and animal drinking. This may significantly reduce fresh water consumption by over 50%.

The swine and bovine waste may also be subject to anaerobic digestion prior to being processed into the organic based fertilizer and usable water. Anaerobic digestion of the waste will result in the production of methane through methanogenesis. The methane may be captured and used to provide heat or power the system. Methane production may be increased by 60% to 75% if cells in the waste are lysed prior to anaerobic digestion. Cell lysis may be accomplished through the use of a cell conditioner.

In preferred embodiments the system operates continuously and is designed to process collected animal waste in 24 hours. The system collects a majority of the solid waste and, after any losses from using some of the solid waste as a bio-mass fuel, the collected solid waste is pelletized into fertilizer. This produces a commercially viable fertilizer which may be sold to help offset operational costs, i.e nutrient imbalances on other agricultural operations may be rectified by transporting the dry pelletized fertilizers off-site. The resulting water filtrate may be diverted for irrigation at points dictated by the economics of the agricultural operator or recycled back to the barn for animal washing or drinking. The methane may be used to power the system.

The system and method disclosed herein provide the advantage of reducing odours by rapidly separating the solid waste from the liquid waste in either the barn or a treatment building connected to, or adjacent, the barn or another enclosure housing livestock. This reduces the contact between urease found in the solid waste and urea found in the liquid waste thereby minimizing release of gases which are harmful to humans, animals, and the environment. Odours and greenhouse gases are also reduced by minimizing anaerobic activity which occurs in longer term storage methods common to other treatment systems currently in use. Agricultural operations can therefore exist closer to urban areas thereby reducing the cost of transporting the livestock to market.

Furthermore, water consumption may be significantly reduced on the agricultural operation through the recycling of water filtrate to the barn or another installation on the agricultural operation. Large scale agricultural operations will also not require disposal acreage for the storage and disposal of liquid manure slurries now used in the production of fertilizer. Energy costs may also be reduced as the methane may be used to heat or power other aspects of the agricultural operation.

Additional advantages of the system and method disclosed herein will be apparent to a person skilled in the art.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1A:
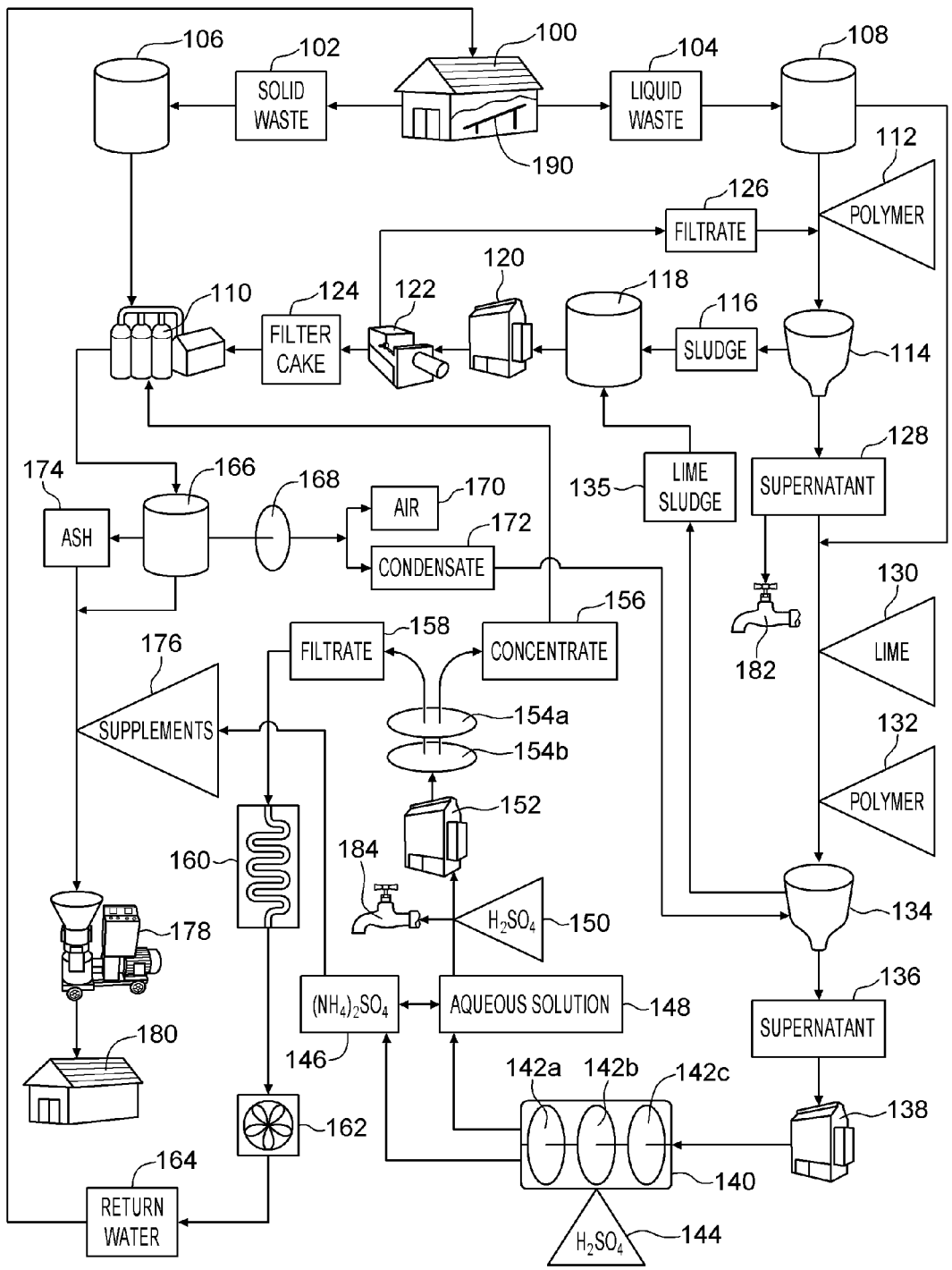
FIG. 1A is a schematic diagram showing a first embodiment of an improved system and method for producing an organic based fertilizer and usable water from animal waste collected with in-barn conveyors on an agricultural operation.

Referring to the drawings and first to FIG. 1 this is a schematic diagram showing a first embodiment of an improved system and method for producing an organic based fertilizer and usable water from animal waste collected on an agricultural operation. In this example, animal waste is collected in a barn 100 but in other embodiments animal waste may be collected anywhere on the agricultural operation. Preferably the animal waste is removed from the barn 100 using a conveyor system 190 similar to the type disclosed in U.S. Pat. No. 7,232,036, issued Jun. 19, 2007, to Van Slyke et al., the full disclosure of which is incorporated herein by reference. This allows for the rapid separation of solid wastes from liquid wastes.

In the example shown in FIG. 1A, the conveyor system 190 disclosed by Van Slyke et al. is used to rapidly separate solid waste 102 from liquid waste 104 in the barn 100. The solid waste 102 is collected in a solid waste storage tank 106 and the liquid waste 104 is directed to a liquid waste storage tank 108. The solid waste 102 is directed from the solid waste storage tank 106 to a dryer 110. Some of the dried solid waste may be used as a bio-mass fuel to power the system. However, in this example, a majority of the solid waste 102 is pelletized into a fertilizer while other available bio-mass fuels are used to power the system by fuelling the burners of dryer and heaters disclosed herein.

The liquid waste 104 is agitated in the liquid waste storage tank 108 to avoid settlement of any particulates in the liquid waste 104. The liquid waste 104 is then treated with a first polymer 112 as it is directed to a first clarifier 114. The first polymer 112 is a standard coagulating and/or flocculating agent readily available from chemical supply companies. For example, the first polymer 112 may be a polyacrylamide or polyamine. The purpose of the first polymer 112 is to accumulate suspended particulates in the liquid waste 104 so they can be more easily settled in the first clarifier 114. Sludge 116 from the first clarifier 114 is directed to a sludge storage tank 118 from which it is then directed through a first heater 120 to a filter press 122. Filter cake 124 from the filter press 122 is dried in the dryer 110 and used to supplement the solid waste material being pelletized into a fertilizer. In this example, the filter press 122 should be capable of producing a filter cake with a solid matter content of at least 30%. Filtrate 126 from the filter press 122 may be re-introduced into the first clarifier 114 for further processing.

Supernatant 128 from the first clarifier 114 may be released for irrigation as will be discussed in greater detail below. However, in this example, most of the supernatant 128 is treated with lime 130 (to increase pH) and a second polymer 132 as it is directed to a second clarifier 134. The second polymer 132 is a standard coagulating and/or flocculating agent readily available from chemical supply companies. For example, the second polymer 132 may be a polyacrylamide or polyamine. Lime sludge 135 from the second clarifier 134 is directed to the sludge storage tank 118 from which it is directed to the first heater 120 and filter press 122. As disclosed above, filter cake 124 from the filter press 122 is used to supplement the solid waste material being pelletized into a fertilizer. Filtrate 126 from the filter press 122 may be re-introduced into the first clarifier 114 for further processing.

Alternatively, the first clarifier 114 may be bypassed or even removed from the system all together. Liquid waste 104 from the liquid waste storage tank 108 would then be treated with lime 130 and the second polymer 132 as it is directed to the second clarifier 134. This would occur in situations where supernatant 128 from the first clarifier 114 will not be released for irrigation. In other embodiments, the clarifiers 114 and 134 may be provided with a skimmer for collecting any floating materials in the liquid waste which will not settle in the clarifiers 114 and 134, for example, spilled feed or diarrhea which comprises undigested feed. The collected floating materials are directed to the sludge storage tank 118 for further processing. Other means to collect floating materials may also be employed such as dissolved air flotation or charged air flotation.

Supernatant 136 from the second clarifier 134 is passed through a second heater 138 before being passed through an ammonia extractor 140. In some cases, the supernatant 136 may be subject to filtration prior to being passed through the ammonia extractor 140, particularly; if the supernatant 136 contains solid particulates. The solid particulates would then be returned to the sludge storage tank 118 for further treatment. In this example, the ammonia extractor 140 includes a series of gas transfer membranes 142a, 142b and 142c which allow the ammonia gas to transfer and make contact with sulfuric acid 150 on the other side of the membranes and combine to make ammonium sulfate 146 and an aqueous solution 148. In other embodiments other methods of ammonia extraction may be used and other ammonium salts, such as ammonium nitrate, may be produced. The ammonium salts may be used to supplement the solid waste material being pelletized into a fertilizer. The aqueous solution 148 may be released for irrigation as will be discussed in greater detail below. However, in this example, most the aqueous solution 148 is treated with sulfuric acid 150 for pH normalization and both the aqueous solution 148 and ammonium sulfate 146 are passed through a third heater 152.

After being heated the aqueous solution 148 is passed through Direct Contact Distillation Membranes 154a and 154b, or any other system such as a nanotube filtering system, that allows drinking water to pass through the membrane. Such systems typically heat a solution causing water vapour from the warm side to pass through the membrane and condense with a colder solution on the cold side. An example of a suitable Direct Contact Distillation Membrane is disclosed in United States Patent Application Publication Number 2006/0076294 A1 which was filed by Sirkar et al. on Jul. 26, 2006 and the full disclosure of which is incorporated herein by reference. The Direct Contact Distillation Membranes 154a and 154b separate the aqueous solution 148 into concentrated dissolved solids or concentrate 156 and a drinking water filtrate 158. The concentrate 156 is used to supplement the solid waste material being pelletized into a fertilizer. The drinking water filtrate 158 is exposed to UV light in a sterilizer 160 and passed through a cooler 162 prior to being recycled back as return water 164 into the barn 100 for washing or drinking. It is desirable for the return water 164 to have less than 3,000 ppm total dissolved solids.

Referring back to the solid waste 102, the dryer 110 lowers the moisture level of the solid waste 102, filter cake 124, and concentrate 156 to a suitable level to pelletize. Dryer exhaust of warm moist air and dust is directed to a dust collector 166 which separates the dust for return to the solid wastes for pelletizing while directing the air stream to a bio-filter 168 to further condense moisture and reduce odours before being released as air 170. Condensate 172 from the bio-filter may be re-introduced into the second clarifier 134 for further treatment.

If any of the dried solid waste is used as a bio-mass fuel to power the system, the ash 174 may also be used to supplement the solid waste material being pelletized into a fertilizer. Likewise ash from any bio-mass fuel may be used to supplement the solid waste material being pelletized into a fertilizer. Other foreign supplements 176 may also be used to supplement the solid waste material being pelletized into a better balanced fertilizer for the market. The supplemented dried solid waste is pelletized and cooled in a pelletizer 178. The pelletized fertilizer may be kept in an on-site storage 180.

Figure 1B:
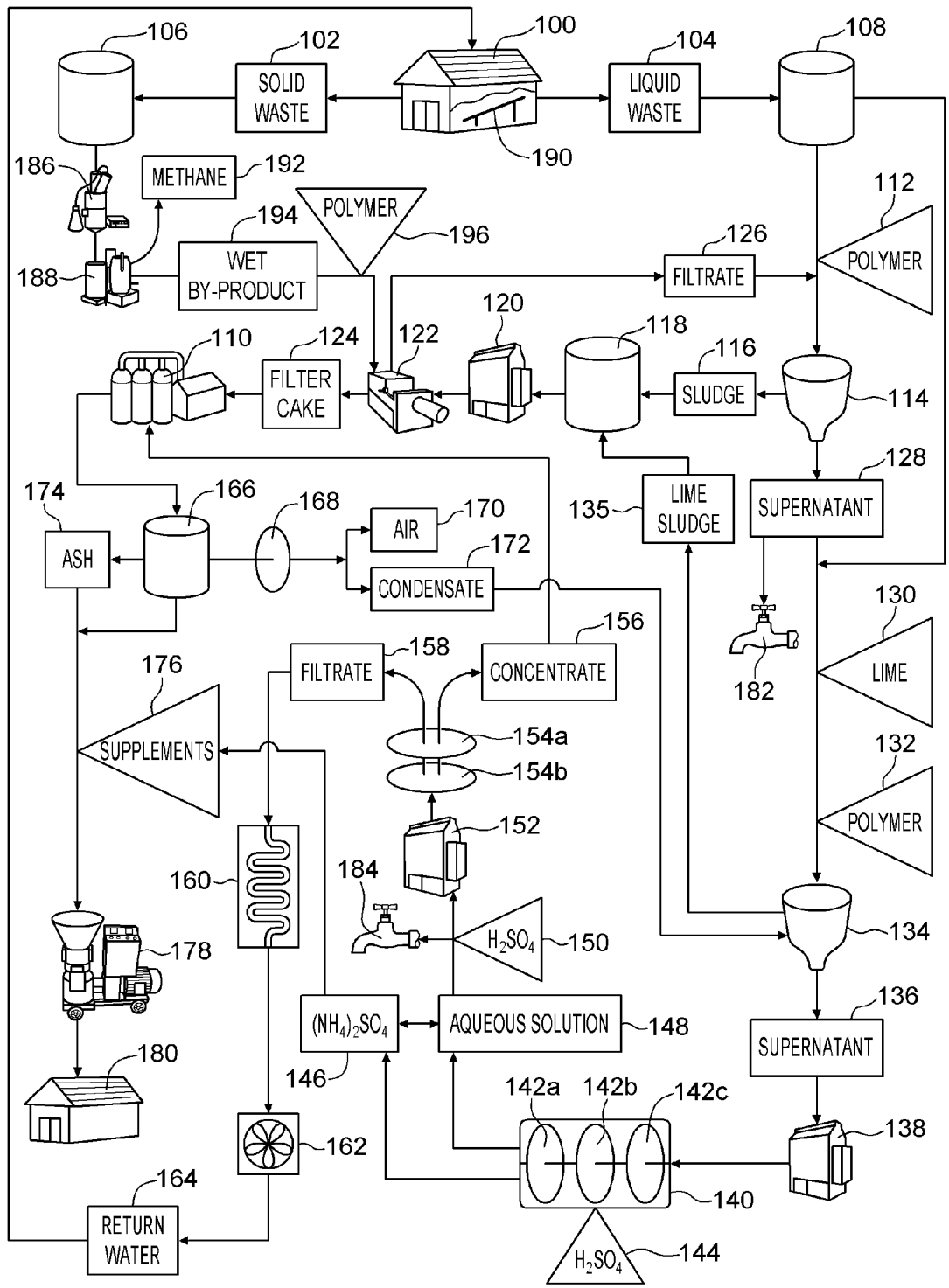
FIG. 1B is a schematic diagram showing the embodiment of FIG. 1A further including a cell conditioner and anaerobic digester to allow for the production of methane.

As shown in FIG. 1B, the system of FIG. 1A may also be fitted with cell conditioner 186 and anaerobic digester 188 to allow for the production of methane 192. Solid waste 102 is directed from the solid waste storage tank 106 to the cell conditioner 186. Water may be added to the solid waste 102 to facilitate pumping and digestion. In this example, the cell conditioner 186 uses OpenCEL® Focused Pulse Technology which is available from OpenCel, LLC of 315 Park Avenue, Glencoe, Ill., 60022. The cell conditioner 186 breaks down cell membranes in the solid waste 102 through cell lysis. This makes the organic matter in the solid waste 102 easier to biodegrade and improves the efficiency of bio-mass to energy conversion. OpenCel, LLC estimates that bio-gas generation may be increased by 60% to 75%.

The solid waste 102 is directed from the cell conditioner 186 to the anaerobic digester 188 after cell lysis. Anaerobic digesters are well known in the art and the anaerobic digester 188 is accordingly not described in detail herein. The solid waste 102 undergoes methanogenesis in the anaerobic digester 188 to produce methane 192 and a wet by-product 194. The methane 192 may be used as fuel to power the system, including heating the anaerobic digester 188. The wet by-product 194 is treated with a third polymer 196 as it is directed to the filter press 122. The third polymer 196 is a standard coagulating and/or flocculating agent readily available from chemical supply companies. For example, the third polymer 196 may be a polyacrylamide or polyamine. The filter press 122 presses the aqueous by-product into filter cake 124 and filtrate 126 which are further processed as described above.

Figure 2A:
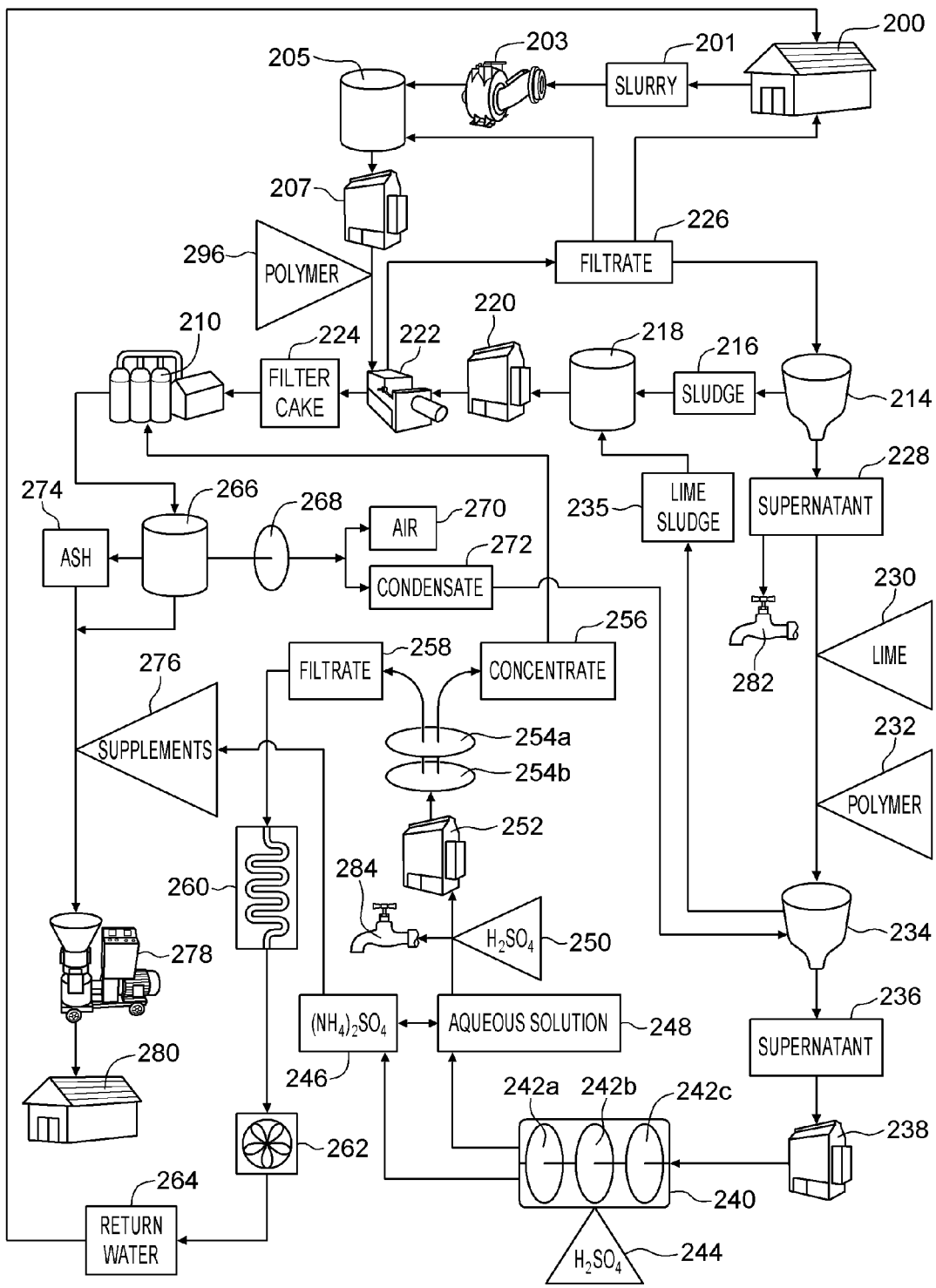
FIG. 2A is a schematic diagram showing a second embodiment of an improved system and method for producing an organic based fertilizer and usable water from animal waste collected by scraping or flushing on an agricultural operation.

Referring now to FIG. 2A, this is a schematic diagram showing a second embodiment of an improved system and method for producing an organic based fertilizer and usable water from animal waste collected on an agricultural operation. In FIG. 2 like components have been given like reference numerals as in FIG. 1 with the expectation that the reference numerals are in the 200 series as opposed to the 100 series, i.e. the barn is given reference numeral 100 in FIG. 1 and reference numeral 200 in FIG. 2. Similarly the dryer has been given reference numeral 110 in FIG. 1 and reference numeral 210 in FIG. 2.

In the example shown in FIG. 2A, animal waste is collected by scraping or flushing the gutters of a barn 200. This results in slurry 201 of solid waste and liquid waste which may contain bedding or stringy components. The slurry 201 is passed through a chopper pump 203 to promote homogeneity. The collected slurry 201 is stored and agitated in a slurry storage tank 205 to avoid the settlement of any particulates. The slurry is then passed through a heater 207 and treated with a polymer 209 as it is directed to a filter press 222. The polymer 209 is a standard coagulating and/or flocculating agent readily available from chemical supply companies. For example, the polymer 209 may be a polyacrylamide or polyamine. The purpose of the purpose of the polymer is to accumulate suspended particulates in the slurry 205 so they can be more easily processed by the filter press 222.

Filter cake 224 from the filter press 222 is directed to a dryer 210 and is treated in a manner substantially similar as described above for the solid waste 102 in the first embodiment of the system and method disclosed herein.

The filtrate 226 from the filter press 222 is directed to a first clarifier 214 or alternatively re-introduced into the slurry storage tank 205 to assist filter press operation or returned to the barn 200 as a replacement for flushing volumes. If the filtrate is directed to the first clarifier 214 it is treated in a substantially similar manner as described above for the liquid waste 104 in the first embodiment of the system and method disclosed herein.

Figure 2B:
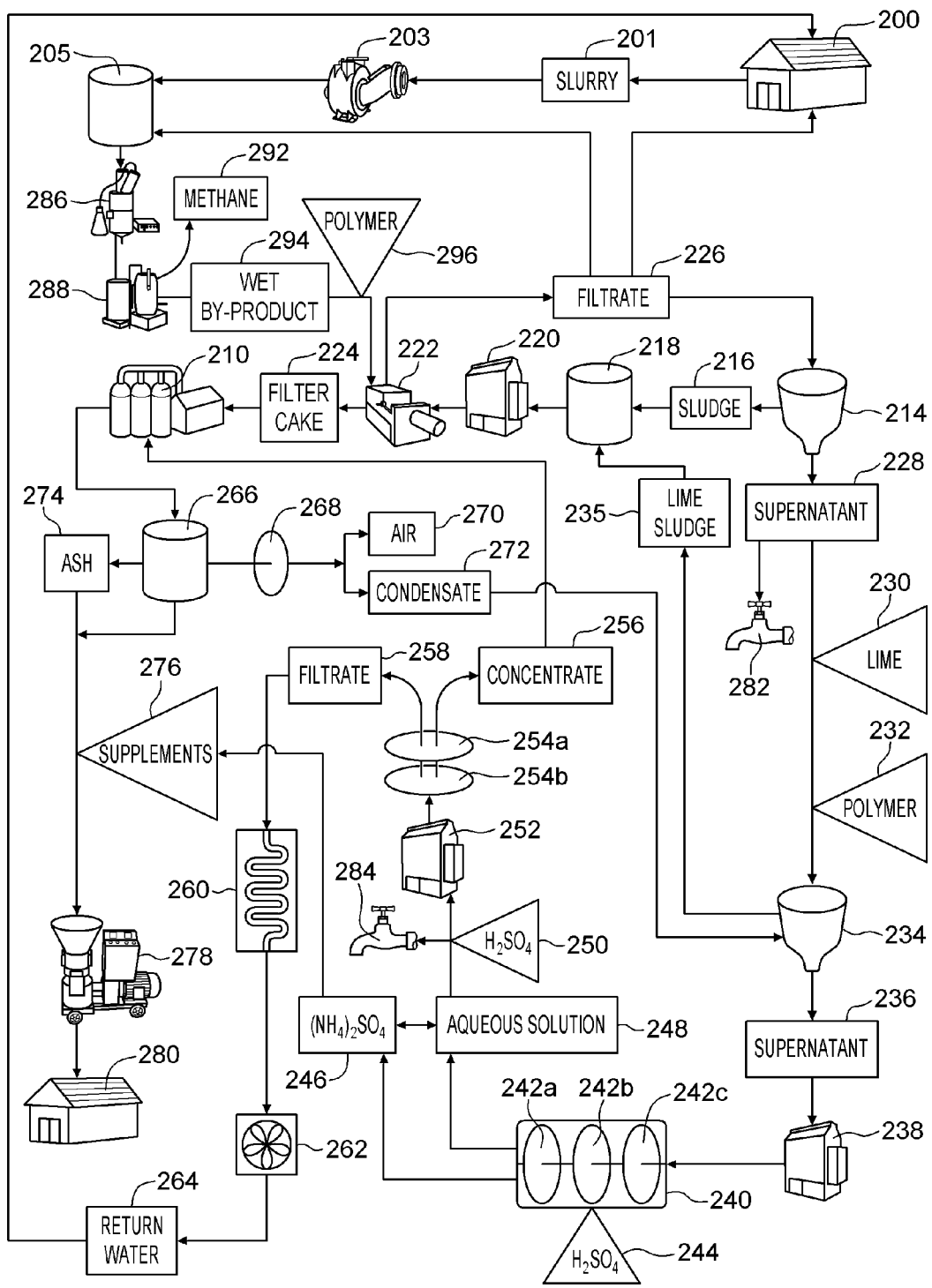
FIG. 2B is a schematic diagram showing the embodiment of FIG. 1A further including a cell conditioner and anaerobic digester to allow for the production of methane.

As shown in FIG. 2B, the system of FIG. 2A may also be fitted with cell conditioner 286 and anaerobic digester 288 to allow for the production of methane 292.

In both embodiments disclosed herein the supernatant 128 or 228 may be released from the system for irrigation through an outlet port 182 or 282 after passing through the first clarifier 114 or 214. This results in a liquid fertilizer with low suspended solids and a nitrogen content that is desirable for some crops. The aqueous solution 148 or 248 may also be released for irrigation after passing through the ammonia extractor 140 or 240. Heat levels of the aqueous solution 148 or 248 can be altered by varying the position of an outlet port 184 or 284 to a point after the third heater 152 or 252. This also results in a liquid fertilizer with low suspended solids and a nitrogen content that is desirable for some crops.

The system disclosed herein accordingly provides a multistep substantially closed loop system that provides flexibility to an operator of an agricultural operation. Nutrients from solid waste may be packaged in a form that may be easily transported and sold. However, the system also allows for varied uses of liquid wastes as well.

If the operator desires irrigation water with all dissolved nutrients and minimal suspended solids then the supernatant 128 or 228 is drawn off after passing through the first clarifier 114 or 214.

If the operator desires irrigation water with ammonia and some dissolved nutrients withdrawn then the aqueous solution 148 or 248 is drawn off after pH normalization with sulfuric acid 150 or 250. In this situation the dosages of the sulfuric acid 150 or 250 as well as the lime 130 or 230 and the second polymer 132 or 232 may be varied to meet the operator's pH requirements. This would provide a liquid fertilizer by-product of ammonium sulfate which may be used by the operator or sold off-set operational costs.

If the operator desires drinking and washing water for animals the filtrate 158 or 258 from the Direct Contact Distillation Membranes should have acceptable pathogen levels. However, as a precaution, further sterilization of the filtrate 158 or 258 is done using UV light in the sterilizer 160 or 260. Also, since animals prefer cool drinking water the filtrate 158 or 258 is also passed through the cooler 162 or 262 prior to being return to the barn 100 or 200 as return water 164 or 264.

In the embodiments of FIGS. 1A and 1B, by-products of the treatment of the liquid waste 104 are re-introduced into the system during the treatment of the solid waste 102 in order to preserve nutrients and avoid other disposal methods.

It will be understood by a person skilled in the art that many of the details provided above are by way of example only, and are not intended to limit the scope of the invention which is to be determined with reference to following claims.

What is claimed is:

1. A method of producing methane, an organic based fertilizer and usable water from animal waste, the method comprising the steps of:
   (a) collecting the animal waste in a barn;
   (b) rapidly separating the animal waste into liquid waste and solid waste in the barn;
   (c) clarifying the liquid waste and thereby producing a supernatant and a sludge;
   (d) extracting ammonia from the supernatant to produce an ammonium salt and an aqueous solution;
   (e) filtering the aqueous solution to produce a concentrate and the usable water;
   (f) subjecting the solid waste to anaerobic digestion to produce methane and a wet by-product;
   (g) pressing the wet by-product to into a filter cake and filtrate; and
   (h) forming the filter cake into the organic based fertilizer.

2. The method as claimed in claim 1 further including the step of lysing cells present in solid waste prior to subjecting the solid waste to anaerobic digestion.

3. The method as claimed in claim 2 further including the step of adding water to the solid waste prior to lysing the cells present in the solid waste.

4. The method as claimed in claim 1 further including the step of treating the liquid waste with a chemical prior to clarifying the liquid waste wherein the chemical is selected from the group consisting of a coagulating agent, a flocculating agent and lime.

5. The method as claimed in claim 1 further including the steps of pressing the sludge into a second filter cake and using said second filter cake to supplement the filter cake being formed into the organic based fertilizer.

6. The method as claimed in claim 1 further including the step using the ammonium salt to supplement the filter cake being formed into the organic based fertilizer.

7. The method as claimed in claim 1 further including the step using the concentrate to supplement the filter cake being formed into the organic based fertilizer.

8. The method as claimed in claim 1 further including the step using a portion of the supernatant as a liquid fertilizer.

9. The method as claimed in claim 1 further including the step of using a portion of the aqueous solution as a liquid fertilizer.

10. The method as claimed in claim 1 further including the step of sterilizing the water filtrate prior to using the water filtrate as drinking or washing water.

* * * * *